(12) United States Patent
Aggarwal et al.

(10) Patent No.: US 7,801,030 B1
(45) Date of Patent: *Sep. 21, 2010

(54) TECHNIQUE FOR USING OER WITH AN ECT SOLUTION FOR MULTI-HOMED SPOKE-TO-SPOKE SITES

(75) Inventors: Gautam Aggarwal, San Jose, CA (US); Pritam Shah, Brookline, MA (US); Ajith Thrivikramannair, Santa Clara, CA (US); Dana Blair, Atlanta, GA (US)

(73) Assignee: Cisco Technology, Inc., San Jose, CA (US)

( * ) Notice: Subject to any disclaimer, the term of this patent is extended or adjusted under 35 U.S.C. 154(b) by 1057 days.

This patent is subject to a terminal disclaimer.

(21) Appl. No.: 11/229,422

(22) Filed: Sep. 16, 2005

(51) Int. Cl.
    *H04J 1/16* (2006.01)
(52) U.S. Cl. .................. 370/228; 370/227; 370/465
(58) Field of Classification Search ............ 370/225, 370/228, 238, 248, 230, 235, 237, 236, 229, 370/395.2, 227, 395.52, 465
    See application file for complete search history.

(56) References Cited

U.S. PATENT DOCUMENTS

| | | | |
|---|---|---|---|
| 6,560,644 B1 | 5/2003 | Lautmann et al. | |
| 6,570,867 B1 * | 5/2003 | Robinson et al. | 370/351 |
| 6,738,910 B1 * | 5/2004 | Genty et al. | 726/15 |
| 6,775,280 B1 | 8/2004 | Ma et al. | |
| 7,200,218 B1 * | 4/2007 | Lindley et al. | 379/221.11 |
| 2002/0172148 A1 * | 11/2002 | Kim et al. | 370/216 |
| 2003/0108051 A1 * | 6/2003 | Bryden et al. | 370/395.54 |
| 2003/0126287 A1 | 7/2003 | Charny et al. | |
| 2003/0135599 A1 * | 7/2003 | Sanger | 709/223 |

OTHER PUBLICATIONS

United States Patent Application Serial No., filed Sep. 16, 2005, entitled Technique for Using OER With an ECT Solution for Multi-Homed Sites, by Aggarwal et al.

(Continued)

*Primary Examiner*—Huy D Vu
*Assistant Examiner*—Dady Chery
(74) *Attorney, Agent, or Firm*—Cesari and McKenna, LLP

(57) ABSTRACT

A technique dynamically creates and utilizes a plurality of multi-homed Virtual Private Network (VPN) tunnels from a client node of one spoke network to a client node of another spoke network in a computer network. According to the technique, a VPN client node, e.g., a "spoke," creates at least one VPN tunnel with an enterprise network, e.g., a "hub." Once the spoke-to-hub tunnel is established, the spoke may dynamically create a plurality of VPN tunnels with a peer spoke network, e.g., a "peer spoke." The spoke designates (e.g., for a prefix) one of the tunnels as a primary tunnel and the other tunnels as secondary tunnels, and monitors the quality (e.g., loss, delay, reachability, etc.) of all of the dynamic tunnels, such as, e.g., by an Optimized Edge Routing (OER) process. The spoke may then dynamically re-designate any one of the secondary tunnels as the primary tunnel for a prefix based on the quality of the tunnels to the peer spoke. Notably, the spoke may also dynamically load balance traffic to the peer spoke among the primary and secondary tunnels based on the quality of those tunnels.

21 Claims, 4 Drawing Sheets

OTHER PUBLICATIONS

Perlman, Radia, "Interconnections Second Edition: Bridges, Routers, Switches, and Internetworking Protocols", Sections 12.1-12.3 pp. 299-324, Addison Wesley Longman, Inc. 2000.

Rekhter, Y. et al., RFC 1771, "A Border Gateway Protocol 4 (BGP-4)", Network Working Group, Mar. 1995, pp. 1-54.

Cisco Systems, "Enterprise Class Teleworker Deployment Guide", Cisco Systems Deployment Guide, Mar. 2005, pp. 1-47, Cisco Systems, Inc.

Cisco Systems, "Enterprise Class Teleworker Solution", Cisco Systems Presentation, May 2005, pp. 1-51, Cisco Systems, Inc.

Security Technology Group, "Enterprise Class Teleworker Management Solution", Mar. 2005, pp. 1-44, Cisco Systems, Inc.

Security Technology Group, "Enterprise Class Teleworker VPNS: Dynamic Multipoint VPN", Nov. 2004, pp. 1-44, Cisco Systems, Inc.

Security Technology Group, "Cisco IOS VPN Enterprise Class Teleworker Solution", Nov. 2004, pp. 1-39, Cisco Systems, Inc.

Leonardo, Pedro, "ECT Deployment Using ISC and EZSDD", 2001, pp. 1-8, Cisco Systems Inc.

Cisco Systems, "Deployment of Secure Sockets Layer VPNS Based on Cisco IOS Software as Standalone Gateway or Combined with the Enterprise Class Teleworker Solution", Cisco Systems Deployment Guide, May 2005, pp. 1-9, Cisco Systems, Inc.

Cisco Systems, "Cisco IOS IPSEC High Availability", Cisco Systems Deployment Guide, Apr. 2005, pp. 1-17, Cisco Systems, Inc.

Cisco Systems, "Secure Voice and Wireless in a VPN Deployment", Cisco Systems Deployment Guide, Apr. 2005, pp. 1-55, Cisco Systems, Inc.

Cisco Systems, "Layered Security in a VPN Deployment", Cisco Systems Deployment Guide, Mar. 2005, pp. 1-29, Cisco Systems, Inc.

"Dynamic Multipoint VPN (DMVPN)", Cisco IOS Releases, Jun. 2005, pp. 1-44, Cisco Systems, Inc.

Sullenberger, Mike, "Dynamic Multipoint IPsec VPNs (Using Multipoint GRE/NHRP to Scale IPsec VPNs", Aug. 2005, pp. 1-54, Cisco Systems, Inc.

Cisco Systems, "Integrated Easy VPN and Dynamic Multipoint VPN", Cisco Systems Deployment Guide, Mar. 2005, pp. 1-21, Cisco Systems, Inc.

Cisco Systems, "Dynamic Multipoint VPN Deployment on Cisco Catalyst 6500 Series Switches—MWAM and Native Modes", Cisco Systems Deployment Guide, May 2005, pp. 1-96, Cisco Systems, Inc.

"NetFlow Services Solutions Guide", Oct. 2004, pp. 1-72, Cisco Systems, Inc.

"NetFlow v9 Export Format", Cisco IOS Release, 2003, pp. 1-22, Cisco Systems, Inc.

U.S. Appl. No. 10/980,550, filed Nov. 3, 2004, entitled Method and Apparatus for Automatically Optimizing Routing Operations at the Edge of a Network, by Shah et al.

Postel, J., RFC 792, "Internet Control Message Protocol", Network Working Group, Sep. 1981, pp. 1-21.

Postel, J., RFC 862, "Echo Protocol", Network Working Group, May 1983, pp. 1.

Jacobson, V. et al., RFC 1072, "TCP Extensions for Long-Delay Paths", Network Working Group, Oct. 1988, pp. 1-15.

* cited by examiner

TECHNIQUE FOR USING OER WITH AN ECT SOLUTION FOR MULTI-HOMED SPOKE-TO-SPOKE SITES

RELATED APPLICATION

This application is related to commonly owned copending U.S. patent application Ser. No. 11/229,421, entitled TECHNIQUE FOR USING OER WITH AN ECT SOLUTION FOR MULTI-HOMED SITES, filed by Aggarwal et al. on even date herewith, the contents of which are hereby incorporated in its entirety.

BACKGROUND OF THE INVENTION

1. Field of the Invention

The present invention relates to computer networks, and more particularly to managing multi-homed tunnels between virtual private network (VPN) clients.

2. Background Information

A computer network is a geographically distributed collection of nodes interconnected by communication links and segments for transporting data between end nodes, such as personal computers and workstations ("hosts"). Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS or an area is generally referred to as a "domain," and a node that interconnects different domains together is generally referred to as a "border node or border router." In general, the autonomous system may be an enterprise network, a service provider or any other network or subnetwork. Furthermore, the autonomous system may be multi-homed, i.e., comprising a plurality of different peer (neighboring) connections to one or more other routing domains or autonomous systems.

The administrative entity of an AS typically configures network nodes within the AS to route packets using predetermined intradomain routing protocols, or interior gateway protocols (IGPs), such as conventional link-state protocols and distance-vector protocols. These IGPs define the manner with which routing information and network-topology information is exchanged and processed in the AS. Examples of link-state and distance-vectors protocols known in the art are described in Sections 12.1-12.3 of the reference book entitled *Interconnections, Second Edition*, by Radia Perlman, published January 2000, which is hereby incorporated by reference as though fully set forth herein.

Link-state protocols, such as the Open Shortest Path First (OSPF) protocol, use cost-based routing metrics to determine how data packets are routed in an AS. As understood in the art, a relative cost value may be associated with a network node to determine the relative ease/burden of communicating with that node. For instance, the cost value may be measured in terms of the average time for a data packet to reach the node, the amount of available bandwidth over a communication link coupled to the node, etc. Network nodes in the AS generate a set of cost values associated with their neighboring nodes. Each set of cost values is then "advertised" (flooded) to the other interconnected nodes. Using the advertised cost values, each node can generate a consistent "view" of the network topology, thereby enabling the nodes to determine lowest-cost routes within the AS.

Distance-vector protocols, such as the Interior Gateway Routing Protocol (IGRP) or Routing Information Protocol (RIP), use distance-based routing metrics to determine how data packets are routed in an AS. A network node may associate a distance metric with each of its interconnected nodes in the AS. For example, the distance metric may be based on, e.g., a number of hops between a pair of nodes or an actual distance separating the nodes. Operationally, the network nodes determine distances to reachable nodes in the AS and communicate these distance metrics to their neighboring nodes. Each neighboring node augments the received set of distance metrics with its own distance measurements and forwards the augmented set of metrics to its neighbors. This process is continued until each node receives a consistent view of the network topology.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

A plurality of interconnected ASes may be configured to exchange routing and reachability information among neighboring interdomain routers of the systems in accordance with a predetermined external gateway protocol, such as the Border Gateway Protocol (BGP). The BGP protocol is well known and generally described in Request for Comments (RFC) 1771, entitled *A Border Gateway Protocol 4 (BGP-4)*, published March 1995, which is hereby incorporated by reference in its entirety. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. To implement the BGP protocol, each AS includes at least one border node through which it communicates with other, interconnected ASes. Because data packets enter and exit the AS through the border node, the border node is said to be located at the "edge" of the AS.

The Enterprise Class Teleworker (ECT) Solution

There are circumstances where an employee (user) may be required to (or desire to) use a company's computer resources outside of the company's main office. "Teleworking" may be used to extend a company's network infrastructure to reach remote and home-based workforces, enhancing employee productivity, satisfaction, and retention. As used herein, teleworking users (teleworkers) include, e.g., mobile/remote employees (employees out of the office for most of their work hours who conduct most of their business at customer locations or while traveling), full-time teleworkers (employees who work from fixed external sites, most often their home), part-time teleworkers (employees who telecommute a few days per week or part-time employees who work from home), day extenders (employees who telecommute primarily in the evenings or on weekends to stretch their workdays), and others (e.g., part-time teleworkers, including consultants who telecommute because of a specific project or event). These teleworkers often require the same environment at home and at any work location, including being able to use computer applications, such as, e.g., licensed software, web conferencing, instant messaging, virtual classrooms, etc., and being able to "carry" their work phone numbers with them. As examples, the ability to access computer (business) applications from home has tremendous application for call center operations, while customer support engineers "on call" have the option of quickly accessing all information directly from their home just as if they were in the office. Also, the teleworkers need to be reachable on their work phone numbers directly (instead of going into voice mail) and be able to make long distance phone calls at corporate rates.

Traditionally, remote-access clients have utilized a virtual private network (VPN) architecture in order to access company resources outside of the main office. A VPN is a collection of network nodes that establish private communications over a shared backbone network. Previously, VPNs were implemented by embedding private leased lines in the shared network. The leased lines (i.e., communication links) were reserved only for network traffic among those network nodes participating in the VPN. Today, the above-described VPN implementation has been mostly replaced by private "virtual circuits" deployed in public networks. Specifically, each virtual circuit defines a logical end-to-end data path between a pair of network nodes participating in the VPN. When the pair of nodes is located in different routing domains, edge devices in a plurality of interconnected routing domains may have to cooperate to establish the nodes' virtual circuit. Notably, a virtual circuit may be established using, for example, conventional layer-2 Frame Relay (FR) or Asynchronous Transfer Mode (ATM) networks. Alternatively, the virtual circuit may "tunnel" data between its logical end points using known layer-2 and/or layer-3 tunneling protocols, such as the Layer-2 Tunneling Protocol (L2TP) and the Generic Routing Encapsulation (GRE) protocol. In this case, one or more tunnel headers are prepended to a data packet to appropriately route the packet along the virtual circuit. The Multi-Protocol Label Switching (MPLS) protocol may be used as a tunneling mechanism for establishing layer-2 virtual circuits or layer-3 network-based VPNs through an IP network.

The Enterprise Class Teleworker (ECT) solution is a type of remote-access VPN solution that combines security, authentication, management (e.g., a "zero touch deployment" where control remains with the enterprise), and quality of service in order to create a truly business-ready teleworker environment, with access to all of the advanced computer and phone (e.g., IP phone) capabilities of the main office. The ECT solution may be used by any type of teleworker that desires substantially constant connectivity to the main office, including telecommuters, Small Office Home Office (SOHO) users, and remote sites or branches. ECT uses Dynamic Multipoint VPN (DMVPN) technology to allow users to better scale large and small IP Security (IPsec) VPNs by combining GRE tunnels, IPsec encryption, and the Next Hop Resolution Protocol (NHRP). This combination creates the ability to dynamically add clients and tunnels without requiring complicated configurations (e.g., crypto-maps) on the server or other clients. Notably, a multipoint GRE (mGRE) tunnel interface may be used to allow a single GRE interface to support multiple IPsec tunnels and simplifies the size and complexity of the configuration.

The ECT solution and supporting technologies are described in the following documents and presentations (available at www.cisco.com/go/ect at the time of filing), the contents of which are hereby incorporated by reference in their entirety:

*Enterprise Class Teleworker Deployment Guide*, March 2005;
*Enterprise Class Teleworker Solution*, May 2005;
*Enterprise Class Teleworker Management Solution*, March 2005;
*Enterprise Class VPNs*, November 2004;
*Cisco IOS VPN Enterprise Class Teleworker Solution*, 2004;
*Enterprise Class Teleworker Deployment using ISC and EZSDD*, 2001;
*Deployment of Secure Sockets Layer VPNs*, May 2005;
*Cisco IOS IPsec High Availability*, April 2005;
*Secure Voice and Wireless in a VPN Deployment*, April 2005; and
*Layered Security in a VPN Deployment*, March 2005.

Further, DMVPN technology is described in the following documents (also available at www.cisco.com/go/ect at the time of filing), the contents of which are hereby incorporated by reference in their entirety:

*Dynamic Multipoint VPN (DMVPN)*, June 2005;
*Dynamic Multipoint IPsec VPNs (Using Multipoint GRE/NHRP to Scale IPsec VPNs)*, August 2005;
*Integrated Easy VPN and Dynamic Multipoint VPN*, March 2005; and
*Dynamic Multipoint VPN Deployment on Cisco Catalyst 6500 Switches—MWAM & Native Modes*, May 2005.

Typically, the ECT solution is embodied as a "hub and spoke" architecture, as will be understood by those skilled in the art. Typically, one router in the hub and spoke architecture is designated as the hub, and all the other routers (spokes) are configured with tunnels to the hub. For example, each client, or spoke, maintains a substantially constant connection with the enterprise network/server, or hub. Specific to the ECT solution, a spoke router generally maintains at least two VPN connections to the corporate network. The first connection is called the management tunnel and is used exclusively for managing the network. The management network hosts all the servers and tools needed for maintaining the network (e.g., an authentication, authorization, and accounting, or AAA server, certificate server, provisioning/management tools, etc.). The second connection carries the data traffic to the corporate network, and is hereinafter referred to as the data tunnel.

The spoke-to-hub data tunnels are continuously operational, and most of the traffic within the hub-and-spoke architecture is between the spoke and the hub. Commonly, the spokes may have a connection (e.g., through the Internet) to the other spokes of the network. In the ECT solution (e.g., using DMVPN), spokes do not need static configuration for direct tunnels to any of the other spokes. Instead, when a spoke wants to transmit a packet to another spoke network (such as the subnet behind another spoke network), it dynamically determines the required destination address of the target spoke network (e.g., by a lookup operation at the hub), and establishes a dynamic spoke-to-spoke tunnel. These spoke-to-spoke tunnels are established on demand whenever there is traffic between the spokes, and packets between spokes may thereafter bypass the hub. Notably, spoke-to-spoke tunnels reduce traffic traversing the hub thereby freeing hub resources needed to, e.g., decrypt and re-encrypt traffic between spokes, while also reducing the total amount of network-wide consumed bandwidth, e.g., especially where the spokes are more closely situated to each other than to the hub. Moreover, as those skilled in the art will understand, these dynamic spoke-to-spoke tunnels are beneficial over a conventional full or partial mesh network, where continuous point-to-point tunnels (e.g., IPsec or IPsec+GRE tunnels) must be configured on all the routers, even if some/most of these tunnels are not running or needed at all times.

Often, the quality of a client's connection away from the office (e.g., a consumer broadband connection to a home) is not consistent, and when business depends upon uninterrupted access to the Internet, this inconsistency may cause problems for the client. For teleworkers, e.g., using the ECT solution, a link failure will mean a loss of connection with the office (enterprise network), and subsequent loss of productivity. Due to the increased availability of network connections (and decreased cost of those connections), many clients use a multi-homed network to increase their connectivity (network "uptime") and uninterrupted access to the enterprise network.

As used herein, a multi-homed network is any network or subnetwork that is directly connected to more than one adjacent network or subnetwork. For instance, a client (or network) may be multi-homed to primary and secondary ISPs. Both the primary and secondary ISPs provide access to an Internet "backbone," i.e., a high-bandwidth, wide-area network that is configured to transport data between remote networks and subnetworks. In this arrangement, the primary ISP functions as the preferred service provider for the customer site, and the secondary ISP functions as a backup service provider. That is, incoming and outgoing network traffic between the customer site and the Internet backbone is preferably routed through the primary ISP. The secondary ISP provides the customer site with access to the Internet backbone in the event that the primary ISP fails, e.g., due to the primary ISP losing connectivity with the Internet backbone and/or the customer site. In response to such a failure, the secondary ISP then becomes the customer site's preferred path for incoming and outgoing network traffic.

A solution for dynamically utilizing the multi-homed spoke-to-hub tunnels is described in above-incorporated U.S. patent application Ser. No. 11/229,421, entitled TECHNIQUE FOR USING OER WITH AN ECT SOLUTION FOR MULTI-HOMED SITES. Currently, however, the ECT solution is configured to dynamically create only one spoke-to-spoke tunnel when it is needed, regardless of the multi-homed capabilities of the spokes. Remote offices and teleworkers often experience poor VPN connections to peer spoke networks due to packet loss, brownouts, and/or heavy congestion over the single tunnel, and currently have no secondary or backup tunnel. There remains a need, therefore, for an improved ECT solution that dynamically creates and utilizes multi-homed spoke-to-spoke tunnels.

SUMMARY OF THE INVENTION

The present invention is directed to a technique for dynamically creating and utilizing a plurality of multi-homed Virtual Private Network (VPN) tunnels from a client node of a spoke network to a peer client node of a peer spoke network in a computer network. According to the technique, a VPN client node, e.g., a "spoke," creates at least one VPN tunnel with an enterprise network, e.g., a "hub." Once the spoke-to-hub tunnel is established, the spoke may dynamically create a plurality of VPN tunnels with a peer spoke network, e.g., a "peer spoke." The spoke designates (e.g., for each reachable address prefix) one of the tunnels as a primary (current) tunnel and the other tunnels as secondary (backup) tunnels, and monitors the performance of traffic, or "quality" (e.g., loss, delay, reachability, etc.) of all of the dynamic tunnels, such as, e.g., by an Optimized Edge Routing (OER) process. The spoke may then dynamically re-designate any one of the secondary tunnels as the primary tunnel for a prefix (i.e., the "best path") based on the quality of the tunnels to the peer spoke. Notably, the spoke (e.g., the OER process at the spoke) may also dynamically load balance traffic to the peer spoke among the primary and secondary tunnels based on the quality of those tunnels.

Advantageously, the novel technique dynamically creates and utilizes a plurality of multi-homed VPN tunnels from a client node of a spoke network to a peer client node of a peer spoke network in a computer network. By dynamically creating more than one spoke-to-spoke tunnel, the inventive technique provides for secondary/backup tunnels in the event the primary tunnel fails or degrades in quality, without requiring the use/interaction of the hub. Also, by dynamically routing traffic between the spoke and peer spoke over multiple tunnels based on tunnel quality, the inventive technique provides a VPN client with increased uptime, high availability, less congestion, brownout avoidance, redundancy, and the ability to load balance among multiple tunnels based on the quality of the tunnels, thereby optimizing spoke-to-spoke tunnel performance.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
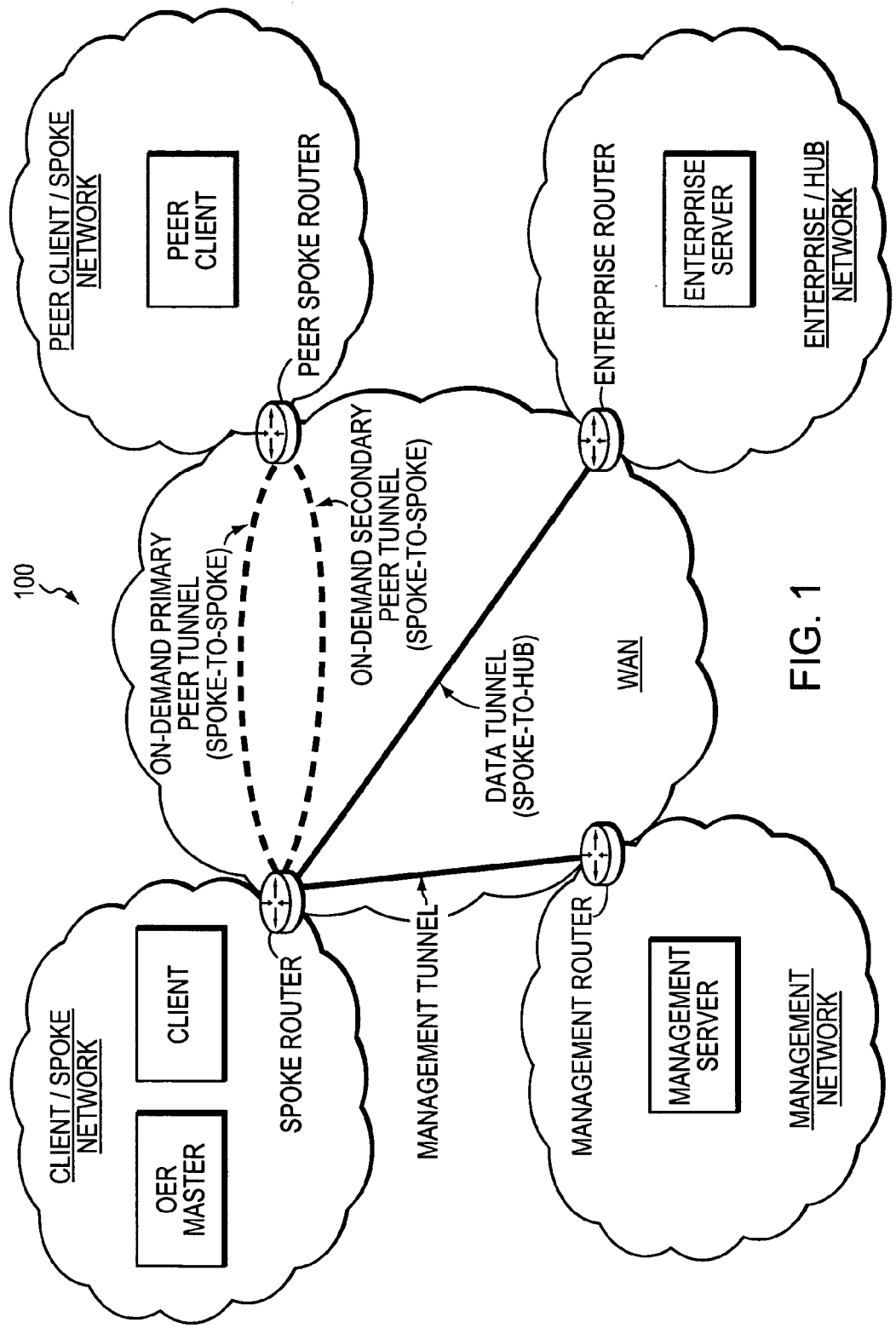
FIG. 1 is a schematic block diagram of an exemplary computer network that may be used in accordance with the present invention.

FIG. 1 is a schematic block diagram of an exemplary computer network 100 comprising a plurality of local area networks (LANs) interconnected via a wide area network (WAN), e.g., one or more Internet service providers (ISPs). The plurality of LANs may include an enterprise/hub network, a management network, and one or more client/spoke networks (e.g., a client/spoke network and a peer spoke network). The enterprise network may contain corporate resources (e.g., within an enterprise server) which may be accessed remotely according to the present invention. The enterprise network may also contain one or more border or edge routers (e.g., enterprise routers), through which client communications from the WAN, such as data packet traffic, can pass into and out of the enterprise network. The management network may contain a management server configured to perform various security/management tasks, e.g., as described herein, and is connected to the WAN by a border router, e.g., the management router.

Each spoke network may generally contain one or more client nodes, such as user end-stations (PCs, IP phones, workstations, etc.), and one or more border routers (e.g., spoke router and peer spoke router). However, for illustration, the principal spoke network for which the present invention is described is referred to herein simply as the "spoke network," while the remaining spoke network(s) is/are referred to herein as "peer spoke networks." Routing operations at the (principal) spoke router may be managed by an optimized edge routing (OER) "Master" node, which may be connected to the spoke router by, e.g., point-to-point links or a local area network. Those skilled in the art will appreciate that each LAN may be configured as an autonomous system (AS), area, level, routing domain, or other network or subnetwork. Also, the WAN may be configured as a single ISP, or multiple ISPs, which provides a multi-homed connection between at least the spoke network and peer spoke network, in accordance with the present invention. These examples are merely representative. Those skilled in the art will understand that any number of routers and nodes may be used in the computer network and connected in a variety of ways, and that the view shown herein is for simplicity.

Data packets may be communicated by the networks using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing decisions within a local network may rely on predetermined "interior" gateway protocols (IGPs), such as conventional link-state or distance-vector protocols. In addition, data packets containing network topology information may be exchanged among the local networks using "external" gateway protocols, such as the Border Gateway Protocol (BGP).

Figure 2:
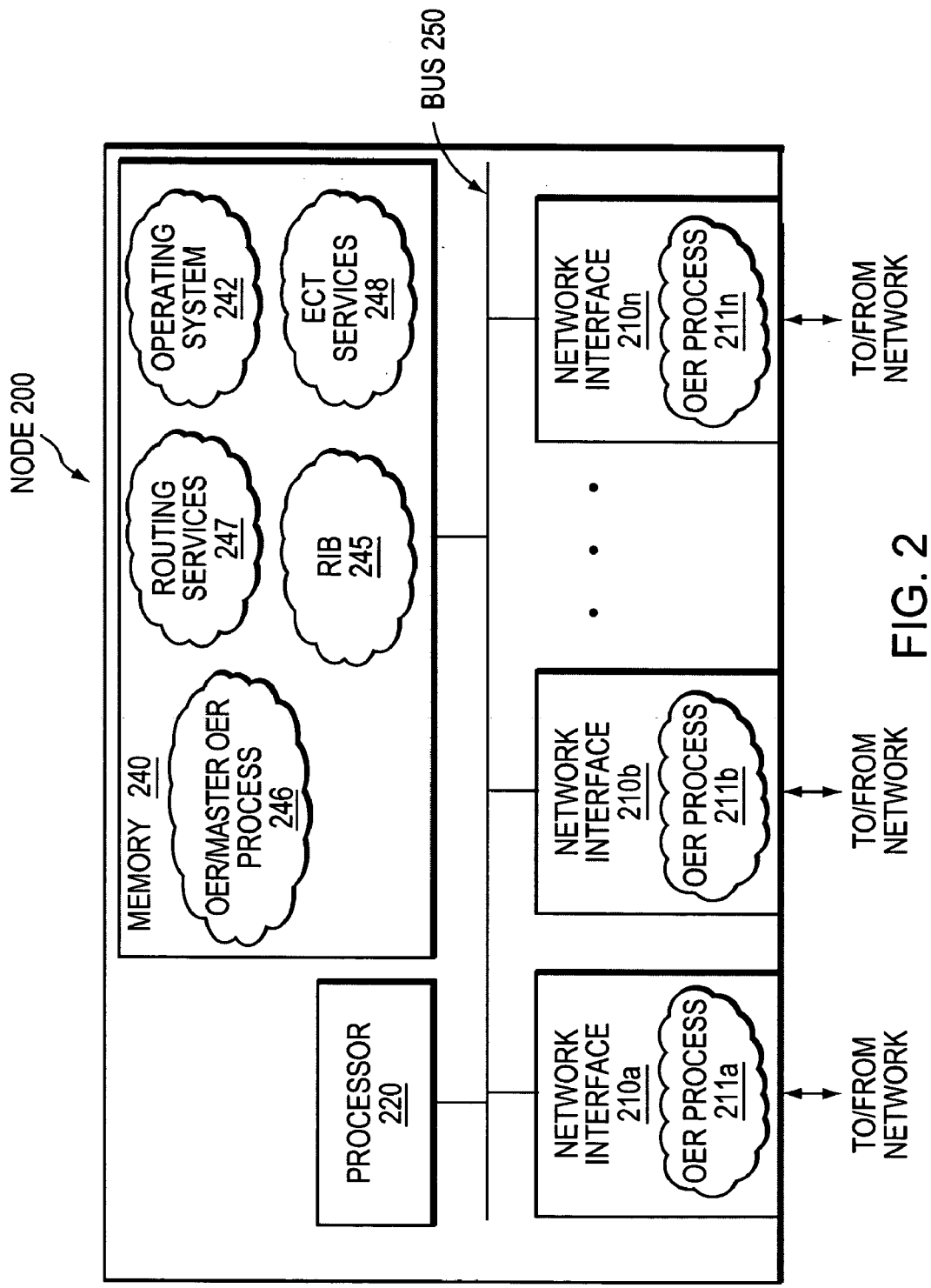
FIG. 2 is schematic block diagram of an exemplary router that may be advantageously used with the present invention.

FIG. 2 is a schematic block diagram of an exemplary node 200 that may be advantageously used with the present invention, such as, e.g., a spoke/hub router or a master/management/client node. The node comprises a plurality of network interfaces 210a-n (e.g., line cards), a processor 220, and a memory 240 interconnected by a system bus 250. The network interfaces 210 contain the mechanical, electrical and signaling circuitry for communicating data over physical links coupled to the network 100, and also may be adapted to process the incoming and outgoing data, such as managing active probe packets in accordance with the present invention. The network interfaces may be further configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art. Both physical network interfaces and virtual network interfaces (e.g., routes out of an edge router) are referred to generally herein as "exits."

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures. An operating system 242 (e.g., the Internetworking Operating System, or IOS™, of Cisco Systems, Inc.), portions of which are typically resident in memory 240 and executed by the processor, functionally organizes the router by, inter alia, invoking network operations in support of software processes and/or services executing on the router. These software processes and/or services may include Routing Information Base to (RIB) 245, Optimized Edge Routing (OER)/Master OER Process 246, routing services 247, and Enterprise Class Teleworker (ECT) services 248. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as OSPF, IS-IS, IP, BGP, etc. These functions may be configured to manage a forwarding information database (not shown) containing, e.g., data used to make forwarding decisions. The RIB 245 maintains copies of routes (paths) provided by the routing protocols, such as IGP or BGP, in order to compute best paths/routes for installation into a routing table (not shown).

ECT services 248 contain computer executable instructions executed by the processor 220 to perform functions relevant to the ECT solution. Illustratively, to establish an ECT connection, a client (spoke) sets up the management tunnel based upon configuration, e.g., after "calling home" to the enterprise network for management instructions. The management network authenticates the spoke, e.g., by using certificate authority and AAA servers, and then pushes the relevant policy (or policies) to the spoke regarding its connection to the hub, e.g., including a new certificate. Notably, while the management network and enterprise network are shown as separate networks, those skilled in the art will understand that they may be embodied as a single network.

Upon receiving the policy information, the spoke establishes a primary data tunnel, (e.g., using DMVPN techniques and NHRP commands) to the enterprise network (hub) in order to access corporate resources. Notably, no GRE or IPsec information about the spoke is configured on the hub router in the DMVPN network. Once it establishes the data tunnel to the hub, the spoke uses NHRP to notify the hub of its current physical interface IP address (particularly useful for dynamic IP addresses). The hub may then update its routing protocols with the new IP address of the spoke, and distribute this information to other spokes (peer spokes) within the ECT network.

These "spoke-to-hub" (or "hub-to-spoke") tunnels are continuously operational, and are used to transmit substantially all traffic between the hub and spoke. When a spoke (source spoke) wants to transmit a packet to another spoke (destination spoke) or, e.g., a subnet behind the destination spoke, the source spoke uses NHRP to dynamically determine the destination address of the destination spoke. For example, assume two spoke clients wish to initiate a Voice over IP (VoIP) call, or other known IP phone serves ice, to one another. In this case, the hub acts as the NHRP server and handles the request for the source spoke. Conventionally, once the information is distributed to the source and destination spokes, one tunnel may be dynamically created between the two spokes (e.g., via a single mGRE interface) and data can be directly transferred from spoke to spoke, bypassing the hub. Notably, this dynamic "spoke-to-spoke" tunnel may be torn down after a configurable period of inactivity. Those skilled in the art will understand that the traffic profile should follow an "80-20 percent rule," where 80 percent of the traffic consists of spoke-to-hub traffic, and 20 percent of the traffic consists of spoke-to-spoke traffic.

It should be further noted that most of the security features are configured on the spoke router for execution by ECT services 248. The security features work at different layers, and can be loosely classified into user/device authentication (e.g., username/password/access control configurations), router security (e.g., physical security/certificate authentication), and network security (e.g., firewalls), each as will be understood by those skilled in the art. These security features safeguard the corporate enterprise network and prevent unguarded entrances to the network. Also, the spoke can be configured in split-tunneling or non-split-tunneling mode. In split-tunneling mode, only the traffic destined for the corporate network is routed to the VPN tunnel; the remaining traffic is routed directly to the ISP. In non-split-tunneling mode, all the traffic is routed via the corporate network regardless of the traffic's destination.

The present invention is directed to a technique for dynamically creating and utilizing a plurality of multi-homed VPN tunnels from a client node of a spoke network to a peer client node of a peer spoke network in a computer network. According to the technique, a VPN client node, e.g., a "spoke," creates at least one VPN tunnel with an enterprise network, e.g., a "hub." Once the spoke-to-hub tunnel is established, the spoke may dynamically create a plurality of VPN tunnels with a peer spoke network, e.g., a "peer spoke." The spoke designates (e.g., for each reachable address prefix) one of the tunnels as a primary (current) tunnel and the other tunnels as secondary (backup) tunnels, and monitors the performance of traffic, or "quality" (e.g., loss, delay, reachability, etc.) of all of the dynamic tunnels, such as, e.g., by an OER process. The spoke may then dynamically re-designate any one of the secondary tunnels as the primary tunnel for the prefix (i.e., the "best path") based on the quality of the tunnels to the peer spoke. Notably, the spoke (e.g., the OER process at the spoke) may also dynamically load balance traffic to the peer spoke among the primary and secondary tunnels based on the quality of those tunnels.

In accordance with the present invention, to address the prior limitations of conventional ECT routing protocols, the spoke router(s) at the edge of a spoke network is configured to dynamically create one or more additional (secondary) spoke-to-spoke tunnels to create multi-homed communication with a peer spoke network, e.g., through one or more ISPs. Furthermore, the spoke router may also be configured as an OER node with VPN support. Here each OER node may be configured to periodically select an Optimal Exit Link (OEL) as the primary link/tunnel to the peer spoke (i.e., the best path) based on performance, load, cost, and service level agreements (SLAs) associated with the multi-homed connections. Ultimately, the end result for the spoke network (i.e., the teleworker) is improved Internet performance, better load distribution, and/or lower costs for Internet connections. These additional procedures may require the spoke router (OER node) to collect various network statistics associated with data flows. An exemplary software application that may be used to collect the network statistics at border nodes is NetFlow™ by Cisco Systems, Incorporated, which is described in more detail in the technical paper entitled *NetFlow Services Solutions Guide*, published September 2002, and is hereby incorporated by reference as though fully set forth herein.

Specifically, OER/Master OER Process 246 is illustratively employed by an OER node (e.g., the spoke router) and an OER Master node (e.g., an OER Master router), respectively. The Master OER process 246 executing on the OER Master node communicates with the spoke router to request, among other things, the monitoring of a set of address prefixes, for example, the address prefix(es) of the peer spoke network. Notably, due to the dynamic nature of the spoke-to-spoke tunnels, the spoke router (e.g., the ECT services 248) first notifies the OER processes 246 of the dynamically created tunnels, so that the OER process is aware of which exit interfaces and prefixes to monitor accordingly. The OER processes 246 executing on the spoke routers monitor traffic at the edge of the spoke network and respond with, inter alia, network statistics corresponding to the monitored prefixes. Illustratively, instances of the OER process 246 execute on the network interfaces 210 as OER processes 211*a-n* configured to measure various types of network statistics acquired from monitored traffic. These statistics are then forwarded from the OER processes 211*a-n* to the OER process 246. The statistics may correspond to various traffic measurements, such as round-trip delay times, data throughput (i.e., the amount of data transferred or received), packet loss, reachability, etc. In general, the OER processes (notably, 246 and/or 211*a-n*) may measure any arbitrary traffic metric, including conventional cost-based and distance-based metrics. Further, the OER Process 246 and/or 211*a-n* may calculate statistical averages, variances, medians, etc. of a collection of traffic measurements. Those skilled in the art will understand that "good or bad" quality based upon various performance characteristics as defined herein may be different for each type of traffic.

Notably, the Master OER process 246 may be distributed among a plurality of nodes, and thus need not reside in a single OER Master node. Also, it is not necessary for a single OER Master node to contain routing processes or routing tables, other than what is necessary for communication with the border nodes. Those skilled in the art will understand that while the OER Master node and OER node (e.g., a border router) are shown as separate nodes (e.g., in FIG. 1), the Master and OER node may be configured within the same node. For example, a single border router (e.g., a home office spoke router) having multiple exits/paths may both monitor the quality of its exits and select the OEL itself.

Techniques that may be used to assist the selection of the primary link for the monitored prefix include passive monitoring and/or active probing. Passive monitoring relies on gathering information from OERs learned from monitoring conventional user traffic, such as throughput, timing, latency, packet loss, reachability, etc. For example, selected interfaces at one or more network nodes monitor incoming and outgoing data flows and collect various statistics for the monitored flows. Notably, interfaces may include physical interfaces, such as a port on a network interface card, and/or logical interfaces, such as VPNs implemented over multiple physical interfaces. Each node stores address prefixes and statistics for the monitored data flows, which may be periodically exported to a central management node (e.g., a "collector" or "Master"). The central management node is configured to receive prefixes and statistics from a plurality of different network nodes. A record format that may be used to export the raw prefixes and statistics is described in the technical paper entitled *NetFlow v9 Export Format*, which is hereby incorporated by reference in its entirety. Further, a more sophisticated interaction (e.g., a filtered and/or pre-processed information exchange) between border nodes and a Master node is described in commonly owned copending U.S. patent application Ser. No. 10/980,550, entitled METHOD AND APPARATUS FOR AUTOMATICALLY OPTIMIZING ROUTING OPERATIONS AT THE EDGE OF A NETWORK, filed by Shah et al. on Nov. 3, 2004, the contents of which are hereby incorporated by reference in its entirety.

Active probing, on the other hand, relies on probe packets to measure various parameters (e.g., jitter, delay, loss, reachability, etc.) associated with accessing the enterprise network from the spoke router. Here, the spoke router, generally upon a request from the OER Master node, may generate multiple probe packets that are then forwarded via the primary and secondary tunnels/link to target nodes (targets) associated with the peer spoke network. Upon receiving the probe packets, the target returns a response (reply) to the border node, such as by, e.g., modifying and returning the probe packet, returning a newly-generated response packet, or including the desired response information in a modified conventional return message (e.g., an ACK message). The spoke router may eventually acquire the responses and use them to measure the various parameters associated with reaching the enterprise network, and return the results to the OER Master node.

For instance, assume that the spoke router measures round-trip packet delay times for traffic sent to a target (e.g., the peer spoke router) in the peer spoke network, such as by measuring latencies of establishing a TCP session. The OER processes 246 and/or 211*a-n* of the spoke router measure the latency between sending a TCP synchronize-sequence-number (SYN) packet to the peer spoke router and receiving a corresponding acknowledgement (ACK) packet. Alternatively, the OER processes may employ other techniques for measuring the round-trip delay times, such as issuing conventional "echo" packets (or "ping" packets). Those skilled in the art will understand that the present invention may be used with a number of protocols, such as ICMP, UDP, TCP, RTP, HTTP, etc. Notably, echo request and reply messages (echo packets) from the various protocols are described generally herein as probe packets. Example probe packets for ICMP, UDP, and TCP are described in more detail in RFC 792, entitled *Internet Control Message Protocol*, published September 1981, RFC 862, entitled *Echo Protocol*, published May 1983, and RFC 1072, entitled *TCP Extensions for Long-Delay Paths*, published October 1988, respectively, the contents of which are hereby incorporated by reference in their entirety.

It should be noted that the source address of the active probe packets may be specifically configured as the address of the particular exit interface for the corresponding tunnel (primary or secondary/backup). By using the unique address of the corresponding exit interface, it is ensured that the probe reply is routed back to the specified interface. This configuration may be necessary in order to obtain accurate results in a VPN architecture (e.g., ECT), as will be understood by those skilled in the art.

Once the relevant statistics are obtained from the OER Process 246 and/or 211*a-n*, they are processed at the Master node in accordance with the Master OER process 246. More specifically, the Master OER process 246 analyzes the statistics and determines whether the distribution of traffic entering and/or leaving the spoke network from/to the peer spoke network can be optimized. If so, the Master OER process may redistribute traffic routed through the spoke router to a particular prefix by, e.g., associating new BGP local-preference values with selected traffic or statically changing the routing table contents of the spoke router, or by simply "selecting" the proper tunnel/link as the primary tunnel/link to the peer spoke network for the particular prefix, as will be understood by those skilled in the art. In the event of a tunnel failure, those skilled in the art will also understand that all traffic (i.e., to all prefixes) to the peer spoke network may be dynamically redirected to the secondary (backup) tunnels in the same manner, thereby providing efficient spoke-to-spoke tunnel redundancy.

Notably, as mentioned above, the spoke (e.g., the OER process 246 at the spoke) may also dynamically load balance traffic to the peer spoke network among the primary and secondary tunnels based on the quality of the tunnels. Various forms of load balancing are known to those skilled in the art, such as dividing the traffic proportionally among the tunnels (e.g., a pre-prefix distribution), separating traffic based on application (e.g., sensitive data, such as voice, over the primary tunnel), or other means. For example, assume in a case of two spoke-to-spoke tunnels that the primary tunnel is 20% better than the secondary tunnel (e.g., according to some measured metric, such as available bandwidth); accordingly, the primary tunnel may receive 20% more traffic than the secondary. Also, in the event both tunnels are performing equally well, both tunnels may receive equal load-balanced traffic. Each of the various forms of load balancing may be used in accordance with the present invention, and as such is within the scope of the present invention.

Moreover, the present invention may also be used with "split tunneling" as described above, where a spoke sends corporate traffic through the tunnels and the rest of the Internet traffic directly through the physical interfaces connected to the WAN. Those skilled in the art will understand that split tunneling is performed by pointing the default route at the physical interface and using, e.g., the Enhanced Interior Gateway Routing Protocol (EIGRP) to route the enterprise traffic via the IPsec GRE tunnels. Those skilled in the art will also understand that some static routes for individual hosts need to be added in order to send Secure Shell (SSH) Protocol traffic and the encapsulated IPsec GRE traffic to the physical interface.

In the event that the client node at the spoke no longer requires a connection to the peer spoke network, ECT services 248 may terminate (tear down) the primary and secondary spoke-to-spoke tunnels. Optionally, a configurable timer may be used to determine a period of unutilized connections, in which case the ECT services may tear down the connections to free up network resources. Once the spoke-to-spoke connection is torn down, ECT services 248 may notify OER processes 246 of the termination since the tunnels no longer need to be monitored. As such, OER processes may be configured to purge (delete) all learned/stored traffic and prefix data regarding the dynamic spoke-to-spoke connections because that data is no longer needed (and notably may have changed substantially by the next time a new connection to the peer spoke network is required).

Figure 3:
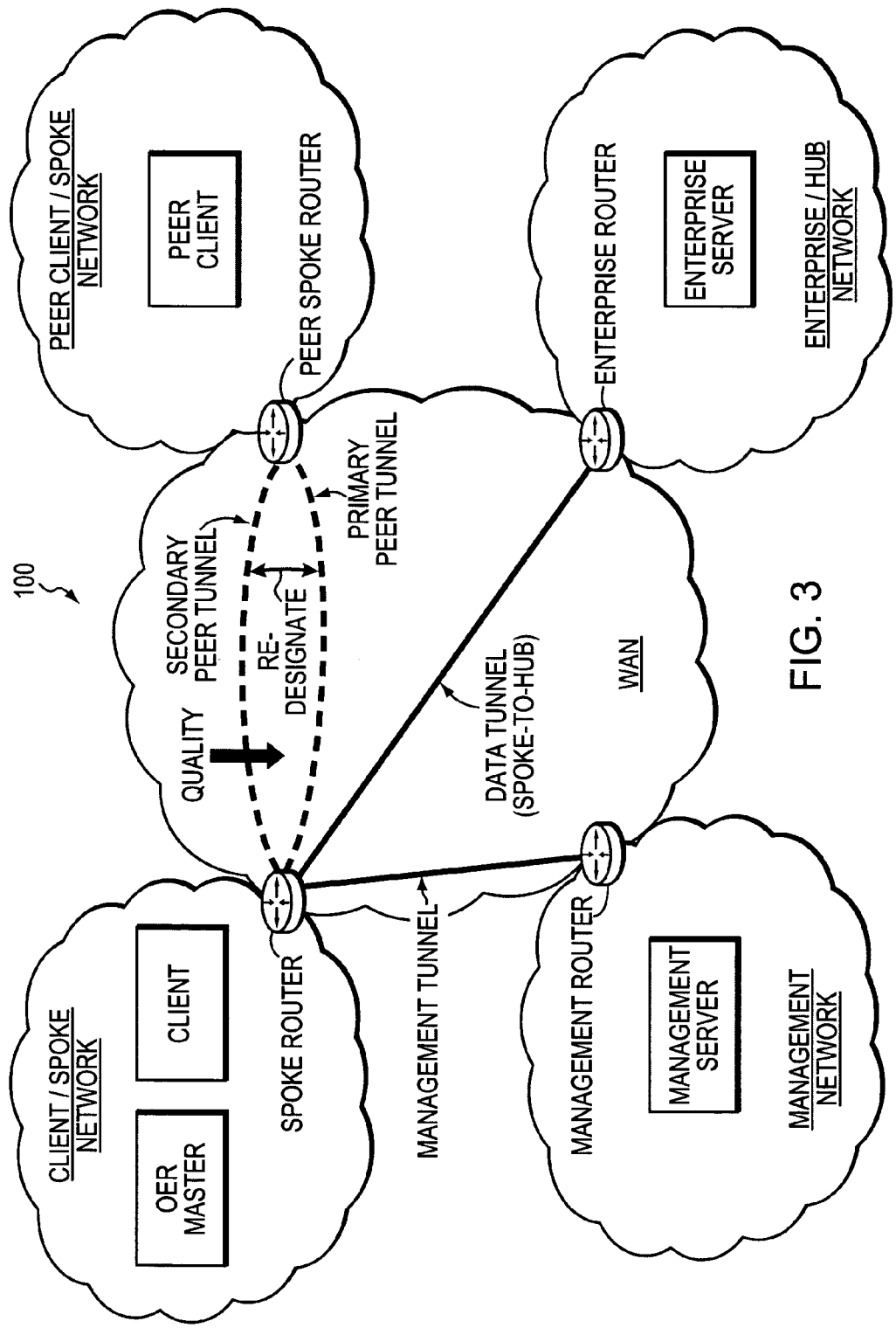
FIG. 3 is a schematic block diagram of an exemplary computer network as in FIG. 1 illustrating a primary spoke-to-spoke tunnel selection in accordance with the present invention.

As a brief example, FIG. 3 is a schematic block diagram of an exemplary computer network 100 as in FIG. 1 illustrating a primary spoke-to-spoke tunnel selection in accordance with the present invention. Assume, as in FIG. 1, that the spoke router has established at least one spoke-to-hub tunnel to the enterprise network. Once the spoke-to-hub tunnel is established, the spoke may desire to send traffic directly to another peer spoke network, bypassing the hub. Accordingly, the spoke dynamically creates both primary and secondary spoke-to-spoke tunnels after obtaining the real (physical) address of the peer spoke network (e.g., of the peer spoke router), such as by requesting the address from the enterprise network (e.g., using the NHRP protocol). During use of the primary spoke-to-spoke tunnel, the OER Process 246 of the spoke router, after being dynamically notified of the exit interfaces for the spoke-to-spoke tunnels, monitors (e.g., for a particular prefix) a decrease in the quality of that tunnel (e.g., an increase in packet loss). Because the OER Process is also monitoring the quality of the secondary spoke-to-spoke tunnel, it can determine whether the decreased quality of the primary tunnel is worse than that of the secondary tunnel. If the quality of the original primary tunnel is worse, the OER Process re-designates the original secondary tunnel as the new primary tunnel for a prefix (e.g., by notifying the ECT services 248, or by rerouting the traffic as described above.) Notably, the determination may be configured to only re-designate the primary tunnel if the original primary has a worse quality by a configurable amount in order to avoid exerting resources for minimal gains, as will be understood by those skilled in the art.

Figure 4:
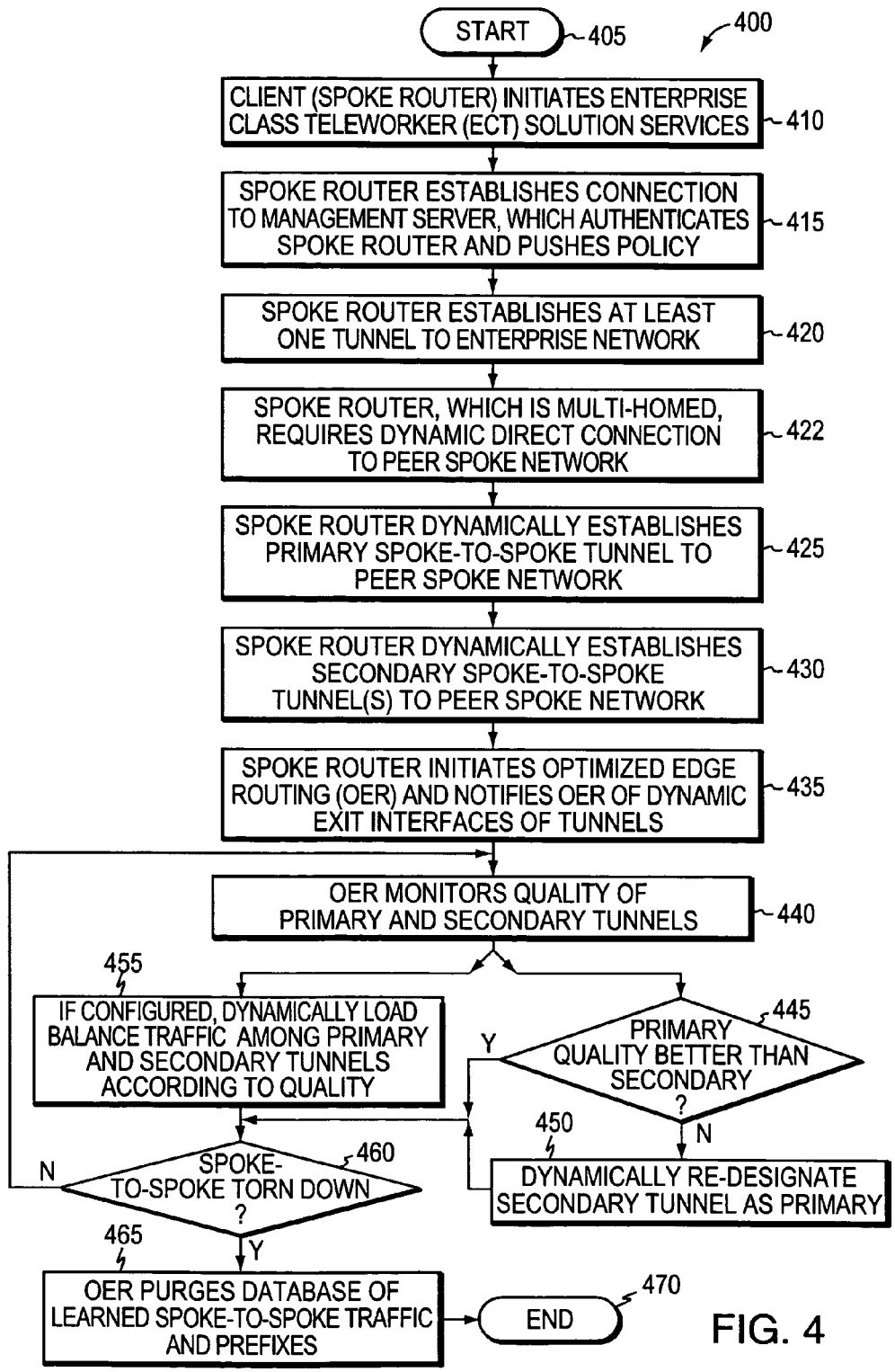
FIG. 4 is a flowchart illustrating a procedure for dynamically utilizing a plurality of multi-homed VPN spoke-to-spoke tunnels in accordance with the present invention.

FIG. 4 is a flowchart illustrating a procedure for dynamically utilizing a plurality of multi-homed VPN spoke-to-spoke tunnels in accordance with the present invention. The procedure 400 starts at step 405, and continues to step 410, where the ECT solution services are initiated, such as when a client wishes to connect to the enterprise network. At step 415, the client (spoke router) establishes a connection to the management server, which authenticates the spoke router and pushes a policy thereto as described above. Upon receiving the policy from the management server, the spoke router establishes at least one tunnel to the enterprise network (hub) in step 420. When the spoke router (i.e., a multi-homed spoke router) requires a dynamic direct connection to a peer spoke network in step 422 (as described above), the spoke router dynamically establishes a primary spoke-to-spoke tunnel to the peer spoke network (peer spoke) in step 425, and at least one secondary spoke-to-spoke tunnel in step 430.

In step 435, the spoke router initiates OER processes 246 and informs the OER processes of the dynamic exit interfaces of the tunnels. The OER process monitors the quality of the primary and secondary spoke-to-spoke tunnels (e.g., the traffic over the tunnels) for reachable address prefixes in the peer spoke network in step 440 in order to determine which tunnel has the better quality for each prefix. If at step 445 the primary spoke-to-spoke tunnel has a better quality than the secondary, no action is taken and the OER process continues to monitor the quality of the tunnels in step 440 until the dynamic spoke-to-spoke connection is torn down in step 460. If, however, at step 445 the primary tunnel does not have a better quality than the secondary for a prefix (e.g., by a configurable amount), the OER process dynamically re-designates the secondary tunnel as the primary tunnel for that prefix in step 450 as described above. The OER process continues to monitor the quality of both tunnels in step 440, until the dynamic spoke-to-spoke connection is torn down in step 460. At that time, the OER process purges the database of learned spoke-to-spoke traffic and prefixes for the connection in step 465, and the procedure ends in step 470. Notably, while the OER process on the spoke router is monitoring the quality of the primary and secondary tunnels in step 440 and possibly re-designating a primary tunnel in step 450, if so configured, it may also dynamically load balance traffic among the primary and secondary tunnels according to their quality in step 455, as described above.

Advantageously, the novel technique dynamically creates and utilizes a plurality of multi-homed VPN tunnels from a client node of a spoke network to a peer client node of a peer spoke network in a computer network. By dynamically creating more than one spoke-to-spoke tunnel, the inventive technique provides for secondary/backup tunnels in the event the primary tunnel fails or degrades in quality, without requiring the use/interaction of the hub. Also, by dynamically routing traffic between the spoke and peer spoke over multiple tunnels based on tunnel quality, the inventive technique provides a VPN client with increased uptime, high availability, less congestion, brownout avoidance, redundancy, and the ability to load balance among multiple tunnels based on the quality of the tunnels, thereby optimizing spoke-to-spoke tunnel performance.

While there has been shown and described an illustrative embodiment that dynamically creates and utilizes a plurality of multi-homed VPN tunnels from a client node of a spoke network to a peer client node of a peer spoke network in a computer network, it is to be understood that various other adaptations and modifications may be made within the spirit and scope of the present invention. For example, the invention has been shown and described herein using a single spoke router as a border router for the multi-homed connection between client spokes. However, the invention in its broader sense is not so limited, and may, in fact, be used with multiple spoke routers to achieve the multi-homed connection. Also, where the above description indicates that the multi-homed tunnels may originate/terminate at a client node, those skilled in the art will understand that the tunnels may alternatively originate/terminate from a spoke router of the client node's spoke network in accordance with the present invention. Further, where the above description indicates that the OER process may redistribute tunnel traffic on a per-prefix basis, those skilled in the art will understand that other means may be used, such as, e.g., per-application, per-traffic-type, etc.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for dynamically creating and utilizing a plurality of multi-homed Virtual Private Network (VPN) tunnels from a client node of a spoke network to a peer client node of a peer spoke network in a computer network, the method comprising:
- establishing one or more spoke-to-hub tunnels from the client node to an enterprise network;
- dynamically establishing a plurality of spoke-to-spoke tunnels from the client node to the peer client node;
- for each of a plurality of reachable address prefixes, designating a first of the plurality of spoke-to-spoke tunnels as a primary spoke-to-spoke tunnel for a respective prefix;
- for each of the plurality of reachable address prefixes, designating remaining tunnels of the plurality of spoke-to-spoke tunnels as secondary spoke-to-spoke tunnels for the respective prefix;
- monitoring quality of the plurality of spoke-to-spoke tunnels for the plurality of prefixes; and
- dynamically re-designating one of the secondary spoke-to-spoke tunnels as the primary spoke-to-spoke tunnel for a particular prefix of the plurality of prefixes based on the quality of the plurality of spoke-to-spoke tunnels for the particular prefix.

2. The method as in claim 1, further comprising:
load balancing traffic carried from the client node to the peer spoke network across the plurality of spoke-to-spoke tunnels based on the quality of the plurality of spoke-to-spoke tunnels.

3. The method as in claim 1, wherein the spoke-to-spoke tunnels are multi-homed to the peer spoke network through separate Internet service providers (ISPs).

4. The method as in claim 1, wherein the VPN is configured as an enterprise class teleworker (ECT) solution VPN.

5. The method as in claim 1, further comprising:
dynamically re-designating one of the secondary spoke-to-spoke tunnels as the primary spoke-to-spoke tunnel for the particular prefix based on the quality of the plurality of spoke-to-spoke tunnels for the particular prefix in response to the primary spoke-to-spoke tunnel having a quality worse than one of the secondary spoke-to-spoke tunnels for the particular prefix by a configurable amount.

6. The method as in claim 1, wherein the client node is a spoke router in a spoke network.

7. The method as in claim 1, wherein the peer client node is a peer spoke router in a peer spoke network.

8. A system for dynamically utilizing a plurality of multi-homed Virtual Private Network (VPN) spoke-to-spoke tunnels, the system comprising:
- an enterprise network;
- a spoke network;
- a peer spoke network;
- a client node in the spoke network; and
- a spoke router between the client node and the peer spoke network, the spoke router having
  A) an enterprise class teleworker (ECT) solution process adapted to i) establish one or more spoke-to-hub tunnels from the client node to the enterprise network, ii) dynamically establish a plurality of spoke-to-spoke tunnels from the client node to the peer client node, iii) for each of a plurality of reachable address prefixes, designate a first of the plurality of spoke-to-spoke tunnels as a primary spoke-to-spoke tunnel for a respective prefix, iv) for each of the plurality of reachable address prefixes, designate remaining tunnels of the plurality of spoke-to-spoke tunnels as secondary spoke-to-spoke tunnels for the respective prefix; and
  B) an optimized edge routing (OER) process adapted to i) monitor quality of the plurality of spoke-to-spoke tunnels for the plurality of prefixes, and ii) dynamically re-designate one of the secondary spoke-to-spoke tunnels as the primary spoke-to-spoke tunnel for a particular prefix of the plurality of prefixes based on the quality of the plurality of spoke-to-spoke tunnels for the particular prefix.

9. The system as in claim 8, wherein the OER process is further configured to load balance traffic carried from the client node to the peer spoke network across the plurality of spoke-to-spoke tunnels based on the quality of the plurality of spoke-to-spoke tunnels.

10. The system as in claim 8, wherein the ECT process is further configured to dynamically notify the OER process of the dynamically established plurality of spoke-to-spoke tunnels.

11. The system as in claim 8, further comprising:
a peer client node in the peer spoke network to receive traffic from the plurality of spoke-to-spoke tunnels.

12. The system as in claim 11, wherein the peer client node is a peer spoke router.

13. A node for use with dynamically creating and utilizing a plurality of multi-homed Virtual Private Network (VPN) tunnels from a client node of a spoke network to a peer client node of a peer spoke network in a computer network, the node comprising:
- one or more network interfaces to communicate with the client node and the peer client node;
- a processor coupled to the one or more network interfaces and adapted to execute software processes; and
- a memory adapted to store
  A) an enterprise class teleworker (ECT) solution process executable by the processor, the ECT solution process configured to i) establish one or more spoke-to-hub tunnels from the client node to the enterprise network, ii) dynamically establish a plurality of spoke-to-spoke tunnels from the client node to the peer client node, iii) for each of a plurality of reachable address prefixes, designate a first of the plurality of spoke-to-spoke tunnels as a primary spoke-to-spoke tunnel for a respective prefix, iv) for each of the plurality of reachable address prefixes, designate remaining tunnels of the plurality of spoke-to-spoke tunnels as secondary spoke-to-spoke tunnels for the respective prefix; and
  B) an optimized edge routing (OER) process executable by the processor, the OER process configured to i) monitor quality of the plurality of spoke-to-spoke tunnels for the plurality of prefixes, and ii) dynamically re-designate one of the secondary spoke-to-spoke tunnels as the primary spoke-to-spoke tunnel for a particular prefix of the plurality of prefixes based on the quality of the plurality of spoke-to-spoke tunnels for the particular prefix.

14. The node as in claim 13, wherein the OER process is further configured to load balance traffic carried from the client node to the peer spoke network across the plurality of spoke-to-spoke tunnels based on the quality of the plurality of spoke-to-spoke tunnels.

15. The node as in claim 13, wherein the ECT process is further configured to dynamically notify the OER process of the dynamically established plurality of spoke-to-spoke tunnels.

16. The node as in claim 13, wherein the node is a spoke router.

17. The node as in claim 13, wherein the peer client node is a peer spoke router.

18. An apparatus for dynamically creating and utilizing a plurality of multi-homed Virtual Private Network (VPN) tunnels from a client node of a spoke network to a peer client node of a peer spoke network in a computer network, the apparatus comprising:
- means for establishing one or more spoke-to-hub tunnels from the client node to an enterprise network;
- means for dynamically establishing a plurality of spoke-to-spoke tunnels from the client node to the peer client node;
- means for designating a first of the plurality of spoke-to-spoke tunnels as a primary spoke-to-spoke tunnel for each of a plurality of reachable address prefixes;
- means for designating remaining tunnels of the plurality of spoke-to-spoke tunnels as secondary spoke-to-spoke tunnels for each of the plurality of reachable address prefixes;
- means for monitoring quality of the plurality of spoke-to-spoke tunnels for the plurality of prefixes; and
- means for dynamically re-designating one of the secondary spoke-to-spoke tunnels as the primary spoke-to-spoke tunnel for a particular prefix of the plurality of prefixes based on the quality of the plurality of spoke-to-spoke tunnels for the particular prefix.

19. The apparatus as in claim 18, further comprising:
- means for load balancing traffic carried from the client node to the peer spoke network across the plurality of spoke-to-spoke tunnels based on the quality of the plurality of spoke-to-spoke tunnels.

20. A non-transitory computer readable storage medium storing executable program instructions for dynamically creating and utilizing a plurality of multi-homed Virtual Private Network (VPN) tunnels from a client node of a spoke network to a peer client node of a peer spoke network in a computer network, the executable program instructions comprising program instructions for:
- establishing one or more spoke-to-hub tunnels from the client node to an enterprise network;
- dynamically establishing a plurality of spoke-to-spoke tunnels from the client node to the peer client node;
- for each of a plurality of reachable address prefixes, designating a first of the plurality of spoke-to-spoke tunnels as a primary spoke-to-spoke tunnel for a respective prefix;
- for each of the plurality of reachable address prefixes, designating remaining tunnels of the plurality of spoke-to-spoke tunnels as secondary spoke-to-spoke tunnels for the respective prefix;
- monitoring quality of the plurality of spoke-to-spoke tunnels for the plurality of prefixes; and
- dynamically re-designating one of the secondary spoke-to-spoke tunnels as the primary spoke-to-spoke tunnel for a particular prefix of the plurality of prefixes based on the quality of the plurality of spoke-to-spoke tunnels for the particular prefix.

21. The non-transitory computer readable storage medium as in claim 20, the executable program instructions further comprising program instructions for:
- load balancing traffic carried from the client node to the peer spoke network across the plurality of spoke-to-spoke tunnels based on the quality of the plurality of spoke-to-spoke tunnels.

* * * * *

UNITED STATES PATENT AND TRADEMARK OFFICE
CERTIFICATE OF CORRECTION

PATENT NO. : 7,801,030 B1
APPLICATION NO. : 11/229422
DATED : September 21, 2010
INVENTOR(S) : Gautam Aggarwal It is certified that error appears in the above-identified patent and that said Letters Patent is hereby corrected as shown below:

Col. 8, Line 32, please amend as shown:

[[to ]](RIB) 245, Optimized Edge Routing (OER)/Master OER

Col. 9, Line 14, please amend as shown:

(VoIP) call, or other known IP phone[[ serves ice]] service, to one

Signed and Sealed this

Thirtieth Day of November, 2010

David J. Kappos
*Director of the United States Patent and Trademark Office*